US011372402B2

(12) United States Patent
Desai et al.

(10) Patent No.: US 11,372,402 B2
(45) Date of Patent: Jun. 28, 2022

(54) AUTONOMOUS GRAIN CART DIMENSIONED TO FIT BEHIND HEADER

(71) Applicant: CNH Industrial America LLC, New Holland, PA (US)

(72) Inventors: Pinakin S. Desai, Naperville, IL (US); Peter Joseph Zerillo, Chicago, IL (US); Stephen Michael Faivre, Sycamore, IL (US); Nathan Taylor, Sycamore, IL (US); Kevin David Monk, Shorewood, IL (US); David W. Larson, Maple Park, IL (US)

(73) Assignee: CNH Industrial America LLC, New Holland, PA (US)

( * ) Notice: Subject to any disclaimer, the term of this patent is extended or adjusted under 35 U.S.C. 154(b) by 313 days.

(21) Appl. No.: 16/303,586

(22) PCT Filed: May 23, 2017

(86) PCT No.: PCT/US2017/034047
§ 371 (c)(1),
(2) Date: Nov. 20, 2018

(87) PCT Pub. No.: WO2017/205406
PCT Pub. Date: Nov. 30, 2017

(65) Prior Publication Data
US 2020/0319632 A1    Oct. 8, 2020

Related U.S. Application Data

(60) Provisional application No. 62/340,921, filed on May 24, 2016.

(51) Int. Cl.
*G05D 1/00* (2006.01)
*A01D 90/16* (2006.01)
(Continued)

(52) U.S. Cl.
CPC ........... *G05D 1/0022* (2013.01); *A01D 90/16* (2013.01); *B60W 10/04* (2013.01); *B60W 10/20* (2013.01);
(Continued)

(58) Field of Classification Search
CPC .. G05D 1/0022; G05D 1/0027; G05D 1/0278; G05D 1/0291; G05D 2201/0201;
(Continued)

(56) References Cited

U.S. PATENT DOCUMENTS

| 4,846,621 A | 7/1989 | Warsaw |
| 6,073,070 A * | 6/2000 | Diekhans ............. A01B 79/005 180/167 |

(Continued)

FOREIGN PATENT DOCUMENTS

| CN | 2283351 Y | 6/1998 |
| EP | 1330948 A1 | 7/2003 |
| WO | 2015173073 A1 | 11/2015 |

OTHER PUBLICATIONS

PCT International Search Report and Written Opinion of International Application PCT/US2017/034047; filed May 23, 2017; 10 pages dated Sep. 14, 2017.
(Continued)

*Primary Examiner* — Jonathan M Dager
*Assistant Examiner* — Jean W Charleston
(74) *Attorney, Agent, or Firm* — Patrick M. Sheldrake; Peter K. Zacharias

(57) ABSTRACT

An autonomous grain cart includes a width less than or equal to a distance from an end of the header of an agricultural vehicle to a lateral side of the agricultural vehicle, wherein the end and the lateral side are on a same longitudinal side of a lateral centerline of the agricultural vehicle, wherein the autonomous grain cart is configured to receive grain from
(Continued)

the agricultural vehicle. The autonomous grain cart also includes a controller, comprising a processor and a memory. The autonomous grain cart further includes a drive system communicatively coupled to the controller, wherein the controller is configured to instruct the drive system to propel the autonomous grain cart. The autonomous grain cart also includes a steering system communicatively coupled to the controller, wherein the controller is configured to instruct the steering system to steer the autonomous grain cart.

18 Claims, 6 Drawing Sheets

(51) Int. Cl.
*B60W 10/04* (2006.01)
*B60W 10/20* (2006.01)
*G05D 1/02* (2020.01)

(52) U.S. Cl.
CPC ......... *G05D 1/0027* (2013.01); *G05D 1/0278* (2013.01); *G05D 1/0291* (2013.01); *B60W 2300/15* (2013.01); *B60W 2554/4023* (2020.02); *B60W 2710/09* (2013.01); *B60W 2710/20* (2013.01); *B60W 2756/10* (2020.02)

(58) Field of Classification Search
CPC ... A01D 90/16; A01D 41/1217; B60W 10/04; B60W 10/20; B60W 2756/10; B60W 2554/4023; B60W 2300/15; B60W 2710/09; B60W 2710/20; A01B 69/008; B60P 1/00; B65G 67/04
USPC .......................................................... 701/24
See application file for complete search history.

(56) References Cited

U.S. PATENT DOCUMENTS

| | | | |
|---|---|---|---|
| 7,440,831 B2 | 10/2008 | Miedema et al. | |
| 7,854,108 B2 | 12/2010 | Koselka et al. | |
| 8,381,501 B2 | 2/2013 | Koselka et al. | |
| 9,949,435 B2* | 4/2018 | Banks, Jr. | ............... E05F 15/70 |
| 10,201,022 B2* | 2/2019 | Matthews | ............ A01B 79/005 |
| 10,412,893 B2* | 9/2019 | Missotten | ............ A01B 69/007 |
| 2006/0047418 A1* | 3/2006 | Metzler | ................ A01B 69/007 |
| | | | 701/469 |
| 2006/0180238 A1* | 8/2006 | Koelker | .................... B65B 3/16 |
| | | | 141/114 |
| 2012/0085458 A1* | 4/2012 | Wenzel | ................ G05D 1/0291 |
| | | | 141/10 |
| 2012/0215381 A1 | 8/2012 | Wang et al. | |
| 2013/0022400 A1* | 1/2013 | Beynet | ................ E21B 43/0122 |
| | | | 405/60 |
| 2013/0022430 A1* | 1/2013 | Anderson | ............ A01D 43/086 |
| | | | 414/334 |
| 2015/0101519 A1 | 4/2015 | Blackwell et al. | |
| 2015/0105962 A1 | 4/2015 | Blackwell et al. | |
| 2015/0105963 A1 | 4/2015 | Blackwell et al. | |
| 2015/0105965 A1 | 4/2015 | Blackwell et al. | |
| 2015/0264866 A1 | 9/2015 | Foster et al. | |
| 2015/0274000 A1* | 10/2015 | Meager | .................. B62D 61/06 |
| | | | 440/12.66 |

OTHER PUBLICATIONS

EP Search Report for EP application 17728345.4, dated Sep. 20, 2019 (7 pages).

* cited by examiner

AUTONOMOUS GRAIN CART DIMENSIONED TO FIT BEHIND HEADER

CROSS REFERENCE TO RELATED APPLICATIONS

This is a national phase of PCT Application No. PCT/US17/34047, entitled "Autonomous Grain Cart Dimensioned to Fit Behind Header", filed on May 23, 2017, which is a continuation of U.S. Provisional Application No. 62/340,921, filed May 24, 2016, entitled "Autonomous Grain Cart Dimensioned to Fit Behind Header," the contents of each of which are incorporated by reference in their entireties for all purposes.

This application is related to a national phase of PCT Application No. PCT/US17/34051, entitled "Grain Cart for Continuous Conveying Agricultural Product", filed on Nov. 20, 2018, which is incorporated by reference in its entirety.

BACKGROUND

The present disclosure relates generally to an autonomous grain cart that conveys agricultural product from an agricultural vehicle to an agricultural product storage tank. In particular, disclosed embodiments include an autonomous grain cart that fits behind a header of the agricultural vehicle while conveying agricultural product from the agricultural vehicle to the grain cart.

Increasing productivity of agricultural operations may be achieved by increasing efficiency of the agricultural vehicles and/or other machines involved, often resulting in increasing the size of the agricultural vehicles and/or machines. However, increasing the size of the agricultural vehicles and/or machines involved in a crop production process (e.g., harvesting, picking, etc.) typically increases the acquisition and/or operational costs of the vehicles and/or machines. Additionally, the larger agricultural vehicles and/or machines may be difficult to transport due to the size and/or weight of the vehicle/machine. The larger and heavier agricultural vehicles and machines may also compact soil and when traveling through a field, resulting in a reduced crop yield. Furthermore, maintenance operations may have greater consequences and impact when the agricultural vehicles and/or machines are larger, as an entire crop production process may be more significantly affected until the equipment is returned to operation.

BRIEF DESCRIPTION

Certain embodiments commensurate in scope with the present disclosure are summarized below. These embodiments are not intended to limit the scope of the disclosure, but rather these embodiments are intended only to provide a brief summary of possible forms of the disclosure. Indeed, the disclosure may encompass a variety of forms that may be similar to or different from the embodiments set forth below.

In a first embodiment, a system for continuously conveying agricultural product includes an agricultural vehicle comprising a header configured to harvest agricultural product from a field. The system also includes a plurality of autonomous grain carts configured to receive the agricultural product from the agricultural vehicle, wherein each autonomous grain cart of the plurality of autonomous grain carts has a width less than or equal to a distance from an end of the header of the agricultural vehicle to a lateral side of the agricultural vehicle, wherein the end and the lateral side are on a same longitudinal side of a lateral centerline of the agricultural vehicle. Each autonomous grain cart of the plurality of autonomous grain carts includes a controller including a processor and a memory. The autonomous grain cart also includes a drive system communicatively coupled to the controller, wherein the controller is configured to instruct the drive system to propel the autonomous grain cart. The autonomous grain cart further includes a steering system communicatively coupled to the controller, wherein the controller is configured to instruct the steering system to steer the autonomous grain cart.

In a second embodiment, an autonomous grain cart includes a width less than or equal to a distance from an end of the header of an agricultural vehicle to a lateral side of the agricultural vehicle, wherein the end and the lateral side are on a same longitudinal side of a lateral centerline of the agricultural vehicle, wherein the autonomous grain cart is configured to receive grain from the agricultural vehicle. The autonomous grain cart also includes a controller, comprising a processor and a memory. The autonomous grain cart further includes a drive system communicatively coupled to the controller, wherein the controller is configured to instruct the drive system to propel the autonomous grain cart. The autonomous grain cart also includes a steering system communicatively coupled to the controller, wherein the controller is configured to instruct the steering system to steer the autonomous grain cart.

In a third embodiment, a system for continuously conveying agricultural product including an agricultural vehicle that includes a header configured to harvest agricultural product from a field. The system also includes a plurality of autonomous grain carts, wherein each autonomous grain cart of the plurality of autonomous grain carts has a width less than or equal to a distance from an end of the header of the agricultural vehicle to a lateral side of the agricultural vehicle, wherein the end and the lateral side are on a same longitudinal side of a lateral centerline of the agricultural vehicle. Each autonomous grain cart of the plurality of autonomous grain carts includes a controller that includes a processor and a memory. Each autonomous grain cart also includes a drive system communicatively coupled to the controller, wherein the controller is configured to instruct the drive system to propel the autonomous grain cart. Each autonomous grain cart further includes a steering system communicatively coupled to the controller, wherein the controller is configured to instruct the steering system to steer the autonomous grain cart. The system further includes an agricultural product storage tank configured to store the agricultural product. Each autonomous grain cart of the plurality of autonomous grain carts is configured to receive the agricultural product from the agricultural vehicle and deliver the agricultural product to the agricultural product storage tank.

DRAWINGS

These and other features, aspects, and advantages of the present invention will become better understood when the following detailed description is read with reference to the accompanying drawings in which like characters represent like parts throughout the drawings, wherein.

Figure 1:
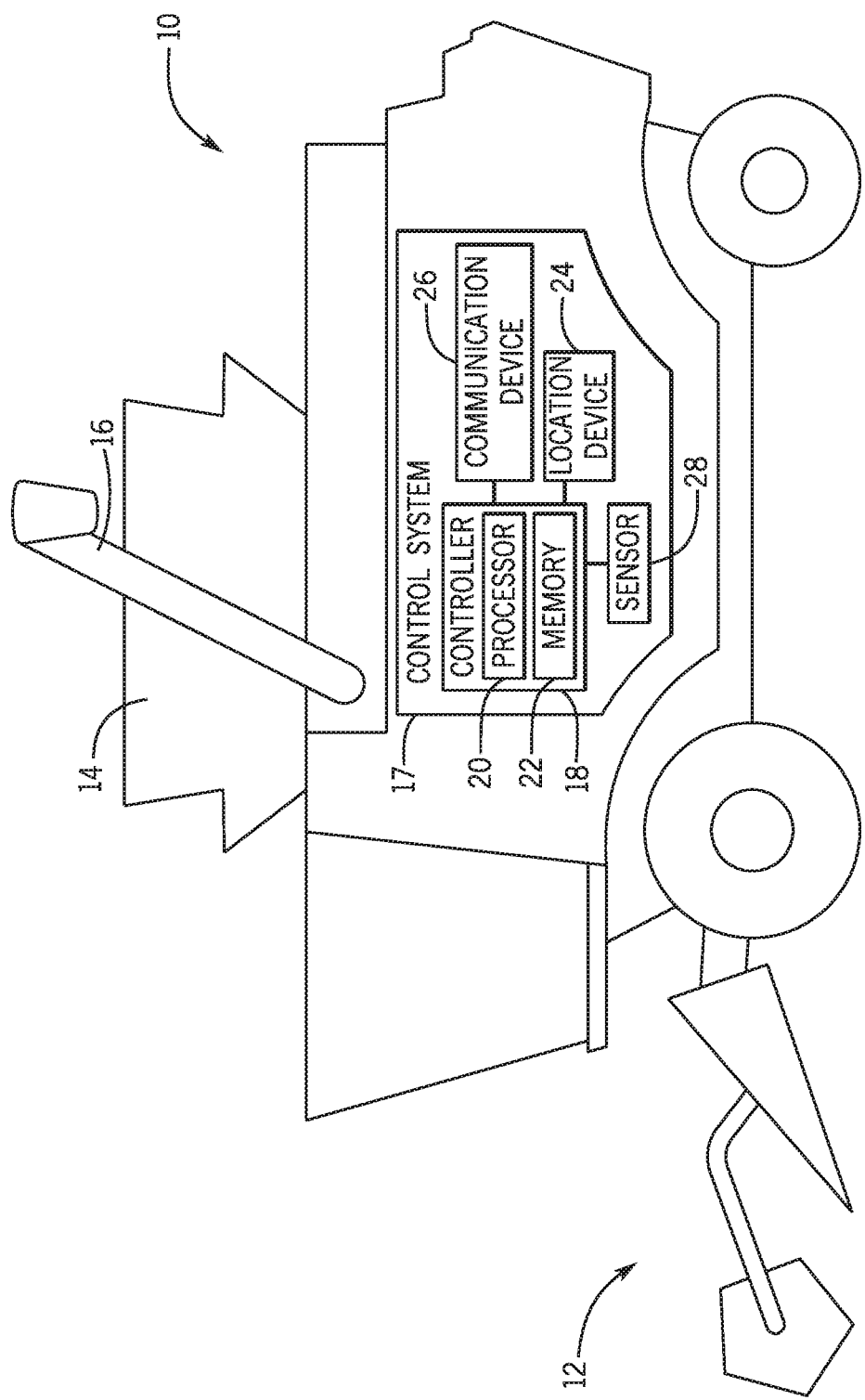
FIG. 1 is a diagram of an agricultural vehicle, in accordance with an embodiment of the present disclosure
Figure 3:
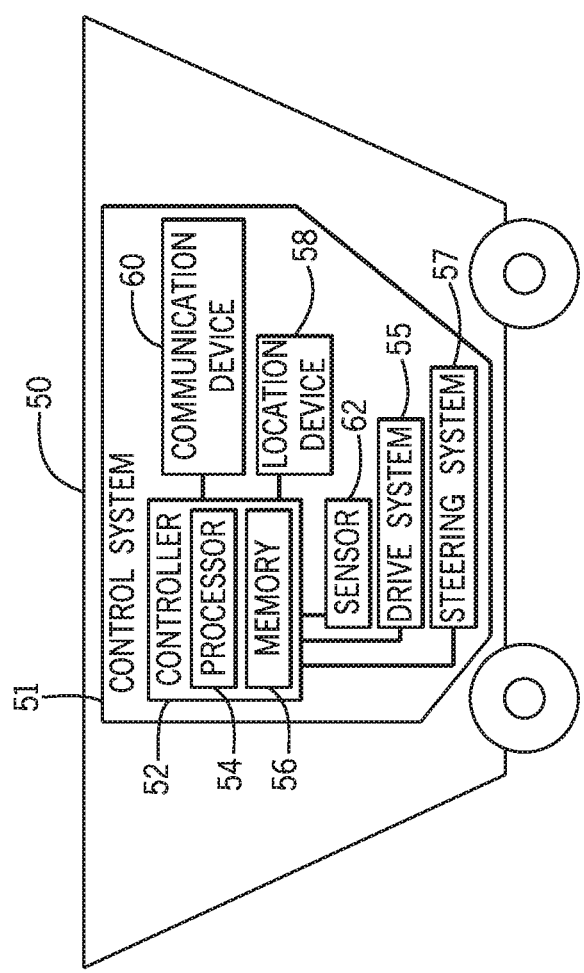
FIG. 3 is a diagram of an autonomous grain cart, in accordance with an embodiment of the present disclosure.
Figure 6:
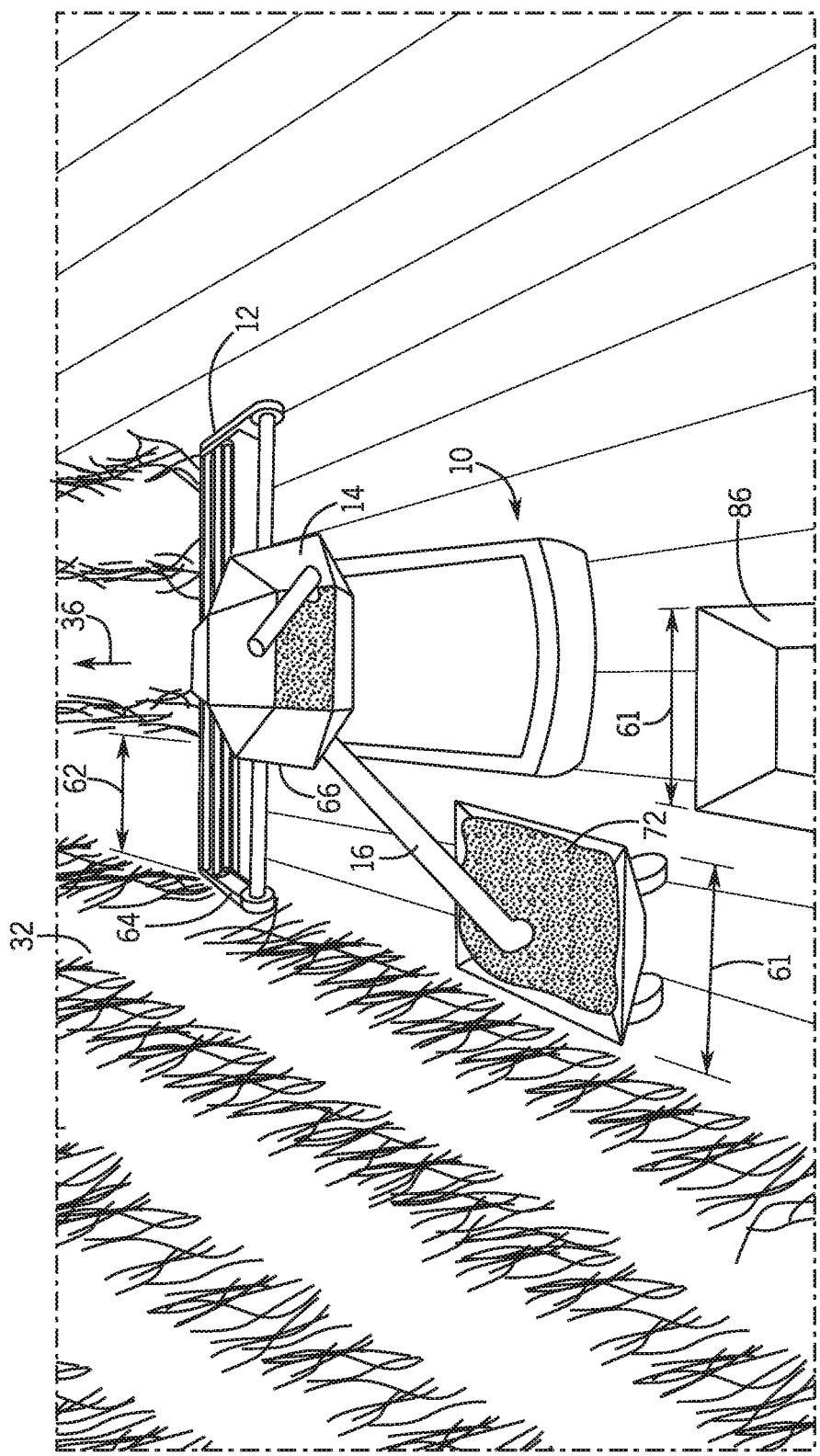
Figure 7:
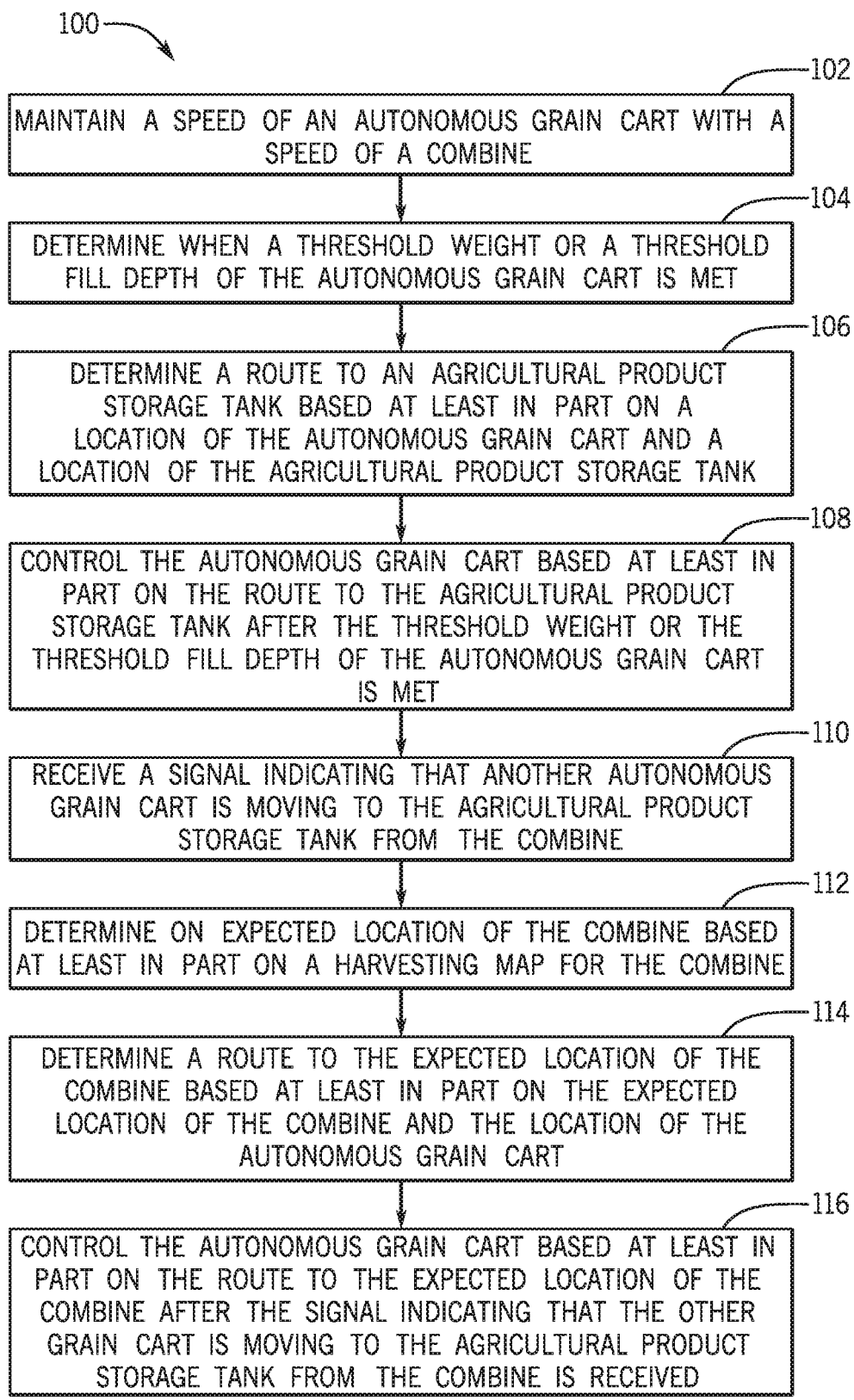

FIG. 6 is a perspective view of the autonomous grain carts of FIG. 3 positioned behind the header of the agricultural vehicle of FIG. 1, in accordance with an embodiment of the present disclosure; and FIG. 7 is a flow diagram of a method for continuously conveying agricultural product from the agricultural vehicle of FIG. 1 to an agricultural product storage tank, which is performed by the autonomous grain cart of FIG. 3, in accordance with an embodiment of the present disclosure.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

It may be desirable to use autonomous grain carts to convey agricultural product from an agricultural vehicle to an agricultural product storage tank during crop production processes (e.g., harvesting, picking, etc.) to increase crop production efficiency. Using an autonomous grain cart may reduce operator and vehicle costs. For example, replacing an operator-driven tractor that hauls a grain cart between an agricultural vehicle and an agricultural product storage tank with an autonomous grain cart may reduce operator costs. Additionally, the autonomous grain cart may operate without the use of a separate tractor, thereby reducing vehicle costs. Moreover, tractors may not be able to fit behind a header of the agricultural vehicle. For example, when positioned between the agricultural vehicle and a crop area to receive grain, the tractor, due to its width, would travel through the crop area, reducing the crop yield. Advantageously, the autonomous grain cart may be dimensioned such that the grain cart fits behind a header of the agricultural vehicle, thereby enabling the grain cart to travel alongside the agricultural vehicle on the crop side of the agricultural vehicle and increase harvesting efficiency. Additionally, harvesting patterns may be utilized without regard to the limitation of placing the grain cart on only the harvested side of the agricultural vehicle. As such, the agricultural vehicle may make 180 degree turns (e.g., when transitioning from one row of the harvesting pattern to another) while continuing to unload grain because of the ability of the grain cart to fit behind the header on the crop side of the agricultural vehicle. Moreover, harvesting headlands first (e.g., before harvesting crop rows) may be avoided, if the field includes enough space for the agricultural vehicle and the grain cart to turn at the edge of the field. Reducing the travel path of the agricultural vehicle in this manner may increase crop production efficiency. With increased access to the agricultural vehicle, the size of the grain carts and/or an internal storage tank of the agricultural vehicle may be reduced, resulting in less weight of the vehicles, and thus less soil compaction during operation. Accordingly, the disclosed embodiments include using an autonomous grain cart to convey agricultural product from an agricultural vehicle to an agricultural product storage tank, in which the grain is dimensioned to fit behind a header of the agricultural vehicle. In particular, one embodiment of the present disclosure includes a system for continuously conveying agricultural product includes an agricultural vehicle comprising a header configured to harvest agricultural product from a field. The system also includes a plurality of autonomous grain carts configured to receive the agricultural product from the agricultural vehicle, wherein each autonomous grain cart of the plurality of autonomous grain carts has a width less than or equal to a distance from an end of the header of the agricultural vehicle to a lateral side of the agricultural vehicle, wherein the end and the lateral side are on a same longitudinal side of a lateral centerline of the agricultural vehicle. Each autonomous grain cart of the plurality of autonomous grain carts includes a controller including a processor and a memory. The autonomous grain cart also includes a drive system communicatively coupled to the controller, wherein the controller is configured to instruct the drive system to propel the autonomous grain cart. The autonomous grain cart further includes a steering system communicatively coupled to the controller, wherein the controller is configured to instruct the steering system to steer the autonomous grain cart. It should be noted that although an autonomous grain cart is shown and described to operate in an agricultural setting, the present disclosure is not limited as such, but may relate to other vehicles, such as construction vehicles, military vehicles, storage vehicles, industrial vehicles, mining vehicles, and so forth.

FIG. 1 is a diagram of an agricultural vehicle 10 (e.g., a combine or harvester), in accordance with an embodiment of the present disclosure. The combine 10 includes a header 12, which may include one or more gathering implements, such as a crop divider, a reel or pickup reel, a cutter bar, a cutting component, or the like, that are configured to gather crops. The combine 10 also includes a storage tank 14 configured to store agricultural product (e.g., grain) collected by the header 12. The present disclosure refers to the agricultural product gathered from the crops and stored in the storage tank 14 as grain, but it should be understood that the agricultural product may be any suitable agricultural product collected from crops and/or a field. As the combine 10 travels through the field and collects more agricultural product, the storage tank 14 fills. The combine 10 includes a side pipe or unloader 16 configured to transfer the grain to a vehicle (e.g., a grain cart), trailer, or a storage tank, for example.

The combine 10 includes a control system 17 having a controller 18. The control system 17 may be configured to output a current location of the combine 10, output a current speed of the combine 10, establish a harvesting pattern, or any combination thereof. The controller 18 includes a processor 20 (e.g., a microprocessor) that may execute software, such as software for controlling the combine 10. Moreover, the processor 20 may include multiple microprocessors, one or more "general-purpose" microprocessors, one or more special-purpose microprocessors, and/or one or more application specific integrated circuits (ASICS), or some combination thereof. For example, the processor 20 may include one or more reduced instruction set (RISC) processors. The controller 18 includes a memory device 22 that may store information such as control software, look up tables, configuration data, etc. In some embodiments, the controller 18 may be coupled to the memory device 22. The memory device 22 may include a volatile memory, such as random access memory (RAM), and/or a nonvolatile memory, such as read-only memory (ROM). The memory device 22 may store a variety of information and may be used for various purposes. For example, the memory device 22 may store processor-executable instructions (e.g., firmware or software) for the processor 20 execute, such as instructions for controlling the combine 10. In some embodiments, the memory device 22 is one or more tangible, non-transitory, machine-readable media that may store machine-readable instructions for the processor 20 to execute. The memory device 22 may include ROM, flash memory, a hard drive, or any other suitable optical, magnetic, or solid-state storage medium, or a combination thereof. The memory device 22 may store data (e.g., position data, identification data, etc.), instructions (e.g., software or firmware for controlling the agricultural vehicle, etc.), any other suitable data, or a combination thereof.

The controller 18 is communicatively coupled to a location device 24 that is configured to determine a position of the combine 10. As will be appreciated, the location device 24 may include any suitable system configured to determine the position of the combine 10, such as a global positioning system (GPS), for example. In certain embodiments, the location device 24 may be configured to determine the position of the combine 10 relative to a fixed point within the field (e.g., via a fixed radio transceiver). Accordingly, the location device 24 may be configured to determine the position of the combine 10 relative to a fixed global coordinate system (e.g., via the GPS) or a fixed local coordinate system. In some embodiments, the location device 24 may enable the controller 18 to determine a speed of the combine 10 during operation.

The controller 18 is communicatively coupled to a communication device 26 that enables the control system 17 to send and receive signals over a communication network, e.g., a wireless communication network. In particular, the communication device 26 enables the control system 17 to output information about the combine 10, such as location information received from the location device 24.

The controller 18 is communicatively coupled to one or more sensors 28, such as a speed sensor, a weight sensor, a fill sensor, etc. The speed sensor may enable the controller 18 to determine a speed of the combine 10 during operation. The weight sensor may enable the controller 18 to determine a weight of the combine 10 and contents of the storage tank 14. The fill sensor may enable the controller 18 to determine a depth of the contents (e.g., grain) of the storage tank 14.

Figure 2:
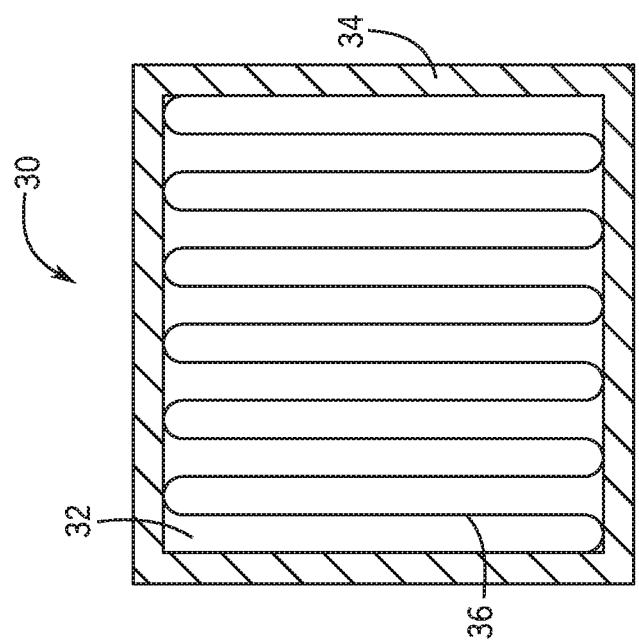
FIG. 2 is a diagram of a harvesting map for the agricultural vehicle of FIG. 1, in accordance with an embodiment of the present disclosure.

FIG. 2 is a diagram of a harvesting map 30 for the combine of FIG. 1, in accordance with an embodiment of the present disclosure. The harvesting map 30 includes a crop area 32 to be harvested and a headland area 34 that may be harvested prior to the crop area being harvested to establish a turning space for the combine. The harvesting map 30 also includes a harvesting pattern or route 36 for the combine to follow. The harvesting pattern 36 may be generated based on an efficient path of travel for the combine as it collects gain from the crop area 32. In some embodiments, the harvesting map 30 may include expected locations of the combine at various times, based at least in part on the speed of the combine.

FIG. 3 is a diagram of an autonomous grain cart 50, in accordance with an embodiment of the present disclosure. It should be appreciated that while the illustrated embodiment includes the autonomous grain cart 50, the present disclosure contemplates any vehicle suitable for transporting material, such as a hauling vehicle, transport vehicle, delivery vehicle, loading and/or unloading vehicle, and the like. As illustrated, the autonomous grain cart 50 is a grain cart.

The grain cart 50 includes a control system 51 having a controller 52. The controller 52 includes a processor 54 (e.g., a microprocessor) that may execute software, such as software for controlling the grain cart 50. Moreover, the processor 54 may include multiple microprocessors, one or more "general-purpose" microprocessors, one or more special-purpose microprocessors, and/or one or more application specific integrated circuits (ASICS), or some combination thereof. For example, the processor 54 may include one or more reduced instruction set (RISC) processors. The controller 52 includes a memory device 56 that may store information such as control software, look up tables, configuration data, etc. In some embodiments, the controller 52 may be coupled to the memory device 56. The memory device 56 may include a volatile memory, such as random access memory (RAM), and/or a nonvolatile memory, such as read-only memory (ROM). The memory device 56 may store a variety of information and may be used for various purposes. For example, the memory device 56 may store processor-executable instructions (e.g., firmware or software) for the processor 54 execute, such as instructions for controlling the grain cart 50. In some embodiments, the memory device 56 is a tangible, non-transitory, machine-readable-medium that may store machine-readable instructions for the processor 54 to execute. The memory device 56 may include ROM, flash memory, a hard drive, or any other suitable optical, magnetic, or solid-state storage medium, or a combination thereof. The memory device 56 may store data (e.g., position data, identification data, etc.), instructions (e.g., software or firmware for controlling the agricultural vehicle, etc.), any other suitable data, or a combination thereof. For example, the memory device 56 may store the harvesting map and/or the harvesting pattern.

The controller 52 is communicatively coupled to a location device 58 that is configured to determine a position of the grain cart 50. As will be appreciated, the location device 58 may include any suitable system configured to determine the position of the grain cart 50, such as a global positioning system (GPS), for example. In certain embodiments, the location device 58 may be configured to determine the position of the grain cart 50 relative to a fixed point within the field (e.g., via a fixed radio transceiver). Accordingly, the grain cart 50 may be configured to determine the position of the grain cart 50 relative to a fixed global coordinate system (e.g., via the GPS) or a fixed local coordinate system. In some embodiments, the location device 58 may enable the controller 52 to determine a speed of the grain cart 50 during operation.

The controller 52 is communicatively coupled to one or more sensors 62, such as a speed sensor, a proximity sensor, a terrain sensor, a weight sensor, a fill sensor, etc. The speed sensor may enable the controller 52 to determine a speed of the grain cart 50 during operation. The weight sensor may enable the controller 52 to determine a weight of the grain cart 50 and contents of the grain cart 50. The fill sensor may enable the controller 52 to determine a depth of the contents (e.g., grain) of the grain cart 50. The proximity sensor may enable the controller 52 to detect nearby objects or vehicles. The terrain sensor may enable the controller 52 to determine aspects of the terrain under and/or adjacent to the grain cart 50. For example, the terrain sensor may enable the grain cart 50 to detect rough and bumpy terrain, smooth terrain, muddy terrain, and the like. In some embodiments, the terrain sensor is configured to output a signal indicative of at least one property of terrain to the autonomous grain cart 50. The weight sensor may enable the controller 52 to determine a weight of the grain cart 50 and its contents. The fill sensor may enable the controller 52 to determine a depth of the contents (e.g., grain) of the grain cart 50.

The controller 52 is communicatively coupled to a communication device 60 that enables the controller 52 to send and receive information over a communication network, such as a wireless communication network. For example, the communication device 60 may enable the controller 52 to receive information about the combine, such as location information received from the location device 24 of the combine. Advantageously, the use of the autonomous grain carts 50 may reduce operator and vehicle costs, as when compared to collecting grain via an operator-driven tractor coupled to a trailer.

The controller 52 is communicatively coupled to a drive system 55 configured to propel, accelerate, and/or decelerate the autonomous grain cart 50. The drive system 55 may include a motor and/or braking system. The controller 52 is also communicatively coupled to a steering system 57 configured to to steer, navigate, and/or orient the autonomous grain cart 50.

Figure 4:
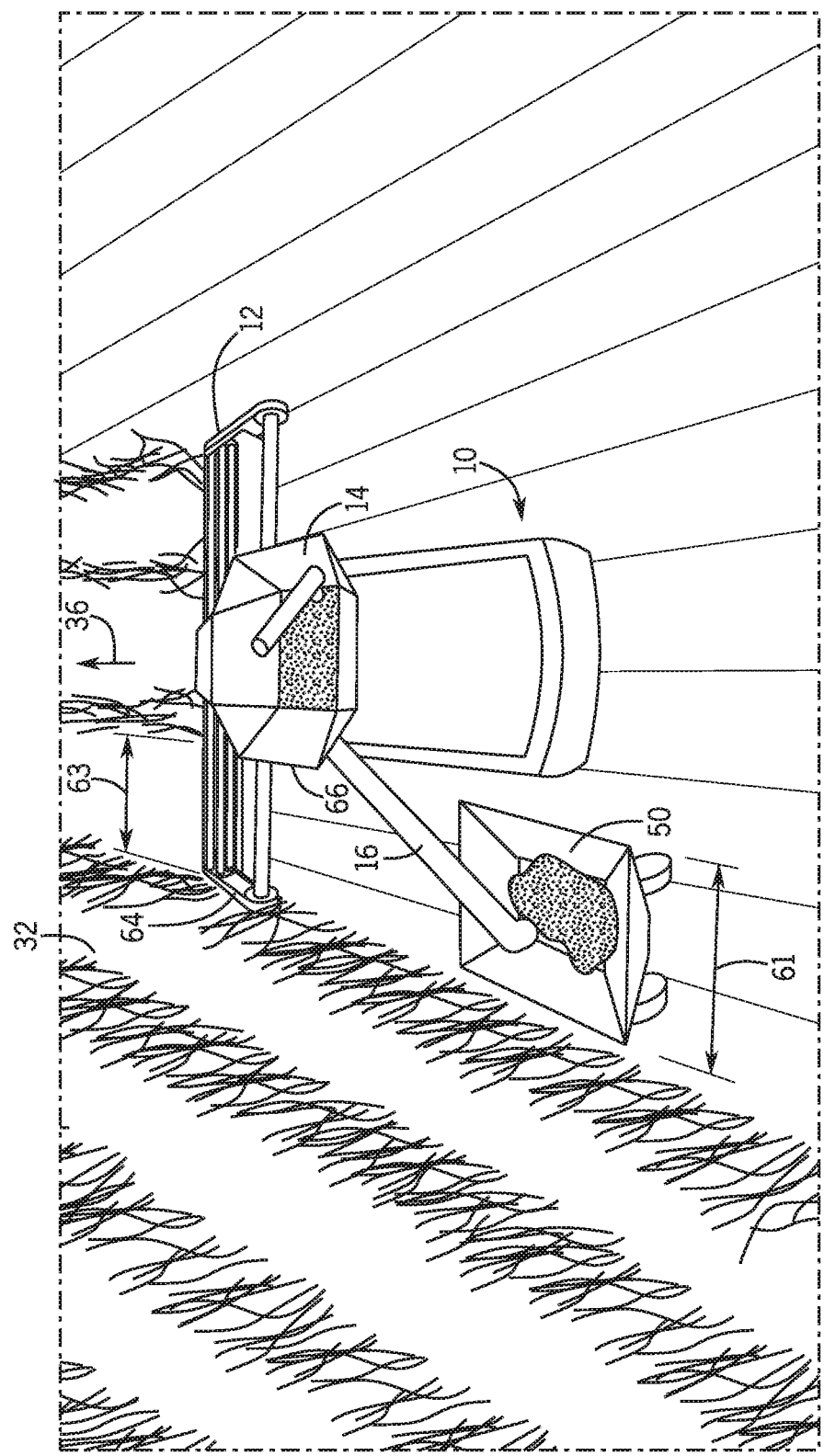
FIG. 4 is a perspective view of the autonomous grain cart of FIG. 3 positioned behind a header of the agricultural vehicle of FIG. 1, in accordance with an embodiment of the present disclosure.

The grain cart 50 may be dimensioned such that the grain cart 50 may fit between an end of the header of the combine and a closer, nearer, or proximal lateral side of the combine. FIG. 4 is a prospective view of the autonomous grain cart 50 of FIG. 3 positioned behind the header 12 of the combine 10 of FIG. 1, in accordance with an embodiment of the present disclosure. Selecting a width 61 of the grain cart 50 that is less than or equal to a distance 63 from an end 64 of the header 12 to a lateral side 66 of the combine 10, wherein the end and the lateral side are on a same longitudinal side of a lateral centerline of the combine 10, enables the grain cart 50 to travel alongside the combine 10 on the crop side of the combine 10 (as well as the harvested side of the combine 10). Advantageously, the grain cart 50 may be dimensioned such that the grain cart 50 fits behind the header 12 of the combine 10, thereby enabling the grain cart 50 to travel alongside the combine 10 on the crop side of the combine 10 and increase harvesting efficiency. Additionally, harvesting patterns may be utilized without regard to the limitation of placing the grain cart 50 on only the harvested side of the combine 10. As such, the combine 10 may make 180 degree turns (e.g., when transitioning from one row of the harvesting pattern to another) while continuing to unload grain because of the ability of the grain cart 50 to fit behind the header 12 on the crop side of the combine 10. Moreover, harvesting headlands first (e.g., before harvesting crop rows) may be avoided, if the field includes enough space for the combine 10 and the grain cart 50 to turn at the edge of the field. Reducing the travel path of the combine 10 in this manner may increase crop production efficiency. With increased access to the combine 10, the size of the grain carts 50 and/or an internal storage tank 14 of the combine 10 may be reduced, resulting in less weight of the vehicles, and thus less soil compaction during operation.

Figure 5:
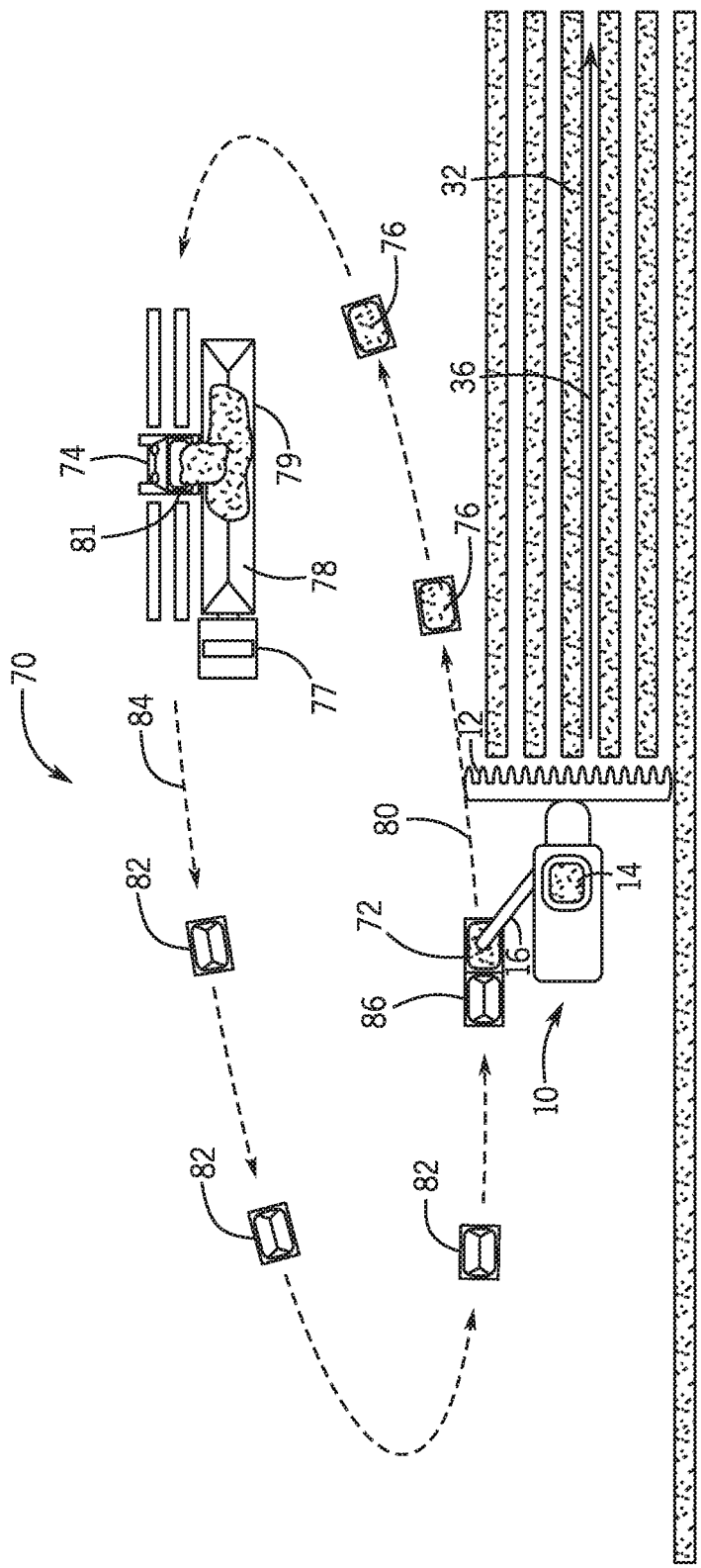
FIG. 5 is a diagram of a system for continuously conveying agricultural product using multiple autonomous grain carts of FIG. 3 with the agricultural vehicle of FIG. 1, in accordance with an embodiment of the present disclosure.

FIG. 5 is a diagram of a system 70 for continuously conveying grain using multiple grain carts of FIG. 3 with the combine 10 of FIG. 1, in accordance with an embodiment of the present disclosure. The system 70 may include two, three, four, five, or more grain carts. As illustrated, the combine 10 unloads grain from the storage tank 14 to a loading grain cart 72 via the side pipe 16. The control system of the grain cart enables the loading grain cart 72 to match and maintain a speed approximately equal to the speed of the combine 10, such that the combine may continue to harvest grain from the crop area 32 and follow the harvesting pattern 36 without interruption. As used in the present disclosure, the term "continuously" means conveying grain unloaded from the combine 10 such that the delay from unloading to a first grain cart to unloading to a second grain cart is reduced and relatively short. For example, the delay may be between approximately 5 seconds and 5 minutes (e.g., 5 seconds, 10 seconds, 30 seconds, 1 minute, 2 minutes, etc.). In some embodiments, the loading grain cart 72 may use one or more proximity sensors to enable the loading grain cart 72 to match and maintain speed approximately equal to the speed of the combine 10.

When the control system of the loading grain cart 72 determines that a threshold weight and/or fill depth of the loading grain cart 72 is met or exceeded, the control system may send a signal (e.g., via the communication device) indicating that the threshold weight and/or fill depth has been met or exceeded, and/or that the loading grain cart 72 is ready to move to the agricultural product storage tank 74 (or any suitable delivery site). The signal may be received by the communication devices of the combine 10 and/or the other grain carts. Further references to sending or receiving signals by a grain cart or the combine 10 should be understood that the respective communication device of the grain cart or the combine 10 is sending or receiving the signals.

The combine 10 may send a signal indicating when the combine 10 has ceased unloading grain. In some embodiments, a queued and unloaded grain cart 86 may move into position immediately behind the loading grain cart 72 (e.g., which the loading grain cart 72 is being loaded) and send a signal indicating that the unloaded grain cart 86 is in position. As such, in some embodiments, the combine 10 may continue loading (from the loading grain cart 72 to the unloaded grain cart 86) without interruption. The number of queued and unloaded grain carts 86 following the combine 10 may be zero, one, two, three, or more, and may be determined by the control system of a grain cart, the grain carts collectively, the combine 10, or a combination thereof. The number of queued and unloaded grain carts 86 following the combine 10 may depend at least in part on the rate of unloading of the combine 10, a weight and/or capacity of each grain cart, or any combination thereof.

Upon receiving the signal indicating that the combine 10 has ceased unloading grain and/or the unloaded grain cart 86 is in position, the now-loaded grain cart 72 may move to the agricultural product storage tank 74. The grain cart 72 may position itself at a location 74 that enables the grain cart 72 to unload grain to the agricultural product storage tank 78. In some embodiments, there may be more than one delivery site 74 for the grain cart 72 (and other loaded grain carts 76) to deliver the grain to multiple agricultural storage tanks 78.

As illustrated, a trailer 79 includes the agricultural storage tank 78. A truck 77 may tow the trailer 79 away when full, and provide a new trailer 79.

The controller of the loading grain cart 72 may determine a route 80 and/or speed to travel to the agricultural product storage tank 78 based at least in part on a current location of the loading grain cart 72, current locations of the other grain carts, a total number of grain carts, the location of the agricultural product storage tank 78, the terrain along the route, the rate of unloading of the combine 10, the rate of unloading of each grain cart to the agricultural product storage tank 78, the speed of the combine 10 while harvesting the crop area 32, the maximum speed of each grain cart (loaded and unloaded), the maximum grain cart turn rate, the maximum grain cart turn angle, or any combination thereof.

The current location of the loading grain cart 72 may be determined by the location device of the loading grain cart 72. The current locations of the other grain carts may be determined by the location devices of the other grain carts, respectively, and communicated by other grain carts to, for example, determine the route 80 and/or speed to travel to the agricultural product storage tank 78. The location of the agricultural product storage tank 78 may be stored in the memory of the loading grain cart 72. The terrain along the route may be determined by the terrain sensor of the loading grain cart 72 and/or the previous loading grain cart. The rate of unloading of the combine 10 may be determined by the controller of the combine 10 and communicated by the combine 10 to each grain cart. The rate of unloading of each grain cart to the agricultural storage tank 78 may be determined by the controller of each grain cart, and sent and received by each grain cart to, for example, determine the route 80 and/or speed to travel to the agricultural product storage tank 78. The speed of the combine 10 while harvesting the crop area 32 may be determined by the controller of the combine 10 and communicated by the combine 10 to each grain cart. The speed of each grain cart (loaded and unloaded) may be determined by the controller of each grain cart, and sent and received by each grain cart to, for example, determine the route 80 and/or speed to travel to the agricultural product storage tank 78.

In some embodiments, the controller of the loading grain cart 72 may determine the route 80 and/or speed to travel to the agricultural product storage tank 78 based at least in part on the current locations of the other grain carts to avoid colliding with the other grain carts and/or to establish a more collectively efficient route among the grain carts. In some embodiments, the controller of the loading grain cart 72 may determine the route 80 and/or speed to travel to the agricultural product storage tank 78 based at least in part on the total number of grain carts because the number of grain carts may affect the route 80 and/or speed to travel. In some embodiments, the controller of the loading grain cart 72 may determine the route 80 and/or speed to travel to the agricultural product storage tank 78 based at least in part on the terrain of the route 80 because traveling on rough or bumpy terrain may be slower and/or use more fuel, and the controller of the loading grain cart 72 may establish a faster and/or more fuel efficient route by avoiding the rough or bumpy terrain, even though the route may be longer. In some embodiments, the controller of the loading grain cart 72 may determine the route 80 and/or speed to travel to the agricultural product storage tank 78 based at least in part on the rate of unloading of the combine 10, the rate of unloading of each grain cart to the agricultural storage tank 78, the speed of the combine 10 while harvesting the crop area 32, the maximum speed of each grain cart (loaded and unloaded), or a combination thereof, such that the controller of the loading grain cart 72 determines when and/or where the loading grain cart 72 will be loaded next, and determines a route that enables the loading grain cart 72 to arrive at the loading location at or before that time.

In some embodiments, the route 80 and/or the speed to travel may be updated or modified based on the aforementioned factors. For example, the controller of a loaded grain cart 76 may determine that one of the other grain carts has stopped moving (e.g., due to engine failure) based on communication with the stopped grain cart, a signal from the proximity sensor of the loaded grain cart 76, or a combination thereof. The control system of the loaded grain cart 76 may update or modify the route 80 and/or speed to avoid the stopped grain cart and/or to compensate for the loss of the stopped grain cart. The route 80 and/or the speed to travel may be updated asynchronously and/or synchronously. For example, the route 80 and/or the speed to travel may be updated asynchronously based on the signal from the proximity sensor of the loaded grain cart 76. The route 80 and/or the speed to travel may also be updated synchronously. For example, the controller of the loaded grain cart 76 may query the other grain carts as to their locations, statuses, or the like, for periodically (e.g., every second, every five seconds, every ten seconds, etc.). If there is an indication that the route 80 and/or speed to travel should be modified (e.g., a grain cart has stopped, has slowed, has a reduced turning radius, etc.), the controller of the loaded grain cart 76 may do so.

In some embodiments, a communications base station may facilitate communication between each grain cart and/or the combine 10. For example, the communications base station may be located on the truck 77. In some embodiments, some or all of the data related to the combine 10, the grain carts, the agricultural product storage tank, the harvesting map, and/or the harvesting pattern may be analyzed and stored in a memory of the communications base station. For example, a wireless computing device that is capable of communicating with the communication devices of the grain carts and/or the combine 10 may determine and/or store some or all of the data to reduce processing time by the grain carts/combine 10 and/or to reduce the data stored by the memory devices of the grain carts/combine 10. The wireless computing device may then send some or all of the data to the communication devices of the grain carts and/or the communication device of the combine 10. As should be appreciated, the communication devices of the grain carts and/or the communication device of the combine 10 may be communicatively coupled to the communications base station, and any and/or all communications referred to in the present disclosure may be sent and received by the communications base station instead of the grain carts and/or the combine 10, to reduce communications load on the communication devices of the grain carts and/or the combine 10. In some embodiments, the communications base station may plan and/or direct (e.g., plan and/or direct the speed, routes, and the like, of) the combine 10 and/or the grain carts.

The threshold weight or threshold fill depth may be a weight or fill depth that is determined to enable the grain carts to operate efficiently without causing bottlenecks or gaps in the unloading and delivery of grain. For example, the threshold weight or threshold fill depth may be a weight or fill depth that enables the grain carts to continuously convey grain from the combine 10 without having the combine 10 store the grain in its storage tank 14 or wait for a grain cart. The threshold weight or threshold fill depth may be based at least in part on a weight and/or volumetric capacity of each grain cart, the weight and/or volumetric capacity of the combine 10, the rate of unloading of the combine 10, the rate of unloading of each grain cart to the agricultural product storage tank 78, the speed of the combine 10 while harvesting the crop area 32, the maximum speed of each grain cart (loaded and unloaded), the maximum grain cart turn rate, the maximum grain cart turn angle, or any combination thereof. For example, the threshold fill depth of each grain cart may be between 30 to 95 percent of the volumetric capacity of the grain cart (e.g., 50, 60, 70, 80, 90 percent, etc.). The threshold weight of each grain cart may be 30 to 95 percent of a weight capacity of the grain cart (e.g., 50, 60, 70, 80, 90 percent, etc.). As such, determining when to unload the grain cart may be based on threshold weight or threshold fill depth. For example, the controller of the grain cart may determine that the grain cart should be unloaded when the volumetric capacity of the grain cart is 70 percent or when the weight capacity is 70 percent. In some embodiments, the threshold weight or threshold fill depth of the grain cart may be a combination of the threshold weight and threshold fill depth. For example, the controller of the grain cart may determine that the grain cart should be unloaded when the volumetric capacity of the grain cart is 70 percent and when the weight capacity is 70 percent. In some embodiments, determining when to stop unloading the combine 10 may be based on the threshold weight or threshold fill depth of the combine 10 may be a minimum threshold. For example, when the storage tank 14 of the combine 10 is 5, 10, or 15 percent full, the combine 10 may cease unloading and send a signal indicating that the loading grain cart 76 may proceed to the agricultural product storage tank 78.

The weight and/or fill depth of each grain cart may be determined by the controller of each grain cart (e.g., via a weight and/or fill sensor), stored in the memory of each grain cart, and/or sent to the other grain carts. The weight and/or fill depth of the combine 10 may be determined by the controller of the combine 10 (e.g., via a weight and/or fill sensor), stored in the memory of the combine 10, and/or sent to each grain cart.

When a loaded grain cart arrives at the agricultural product storage tank 78, the loaded grain cart may stop and send a signal that the loaded grain cart has arrived. In some instances, the loaded grain cart may arrive and there may be one or more other loaded grain carts waiting to deliver grain. As such, the loaded grain cart may queue behind the other loaded grain carts. Once the loaded grain cart is in position to deliver the grain (e.g., the loaded grain cart is at the front of the queue), the loaded grain cart 81 may send a signal indicating that the loaded grain cart 81 is in position. Delivery processes and/or machinery may unload the grain cart 81 and deliver grain to, for example, the agricultural product storage tank 78 of the trailer 79.

Once a grain cart has delivered the grain and is empty, the unloaded grain cart 82 may send a signal indicating that the unloaded grain cart 82 is empty and ready to receive grain. The unloaded grain cart 82 may proceed directly to the combine 10. In addition, the unloaded grain cart 82 may proceed to a waiting area (e.g., a portion of the field or outside the field designated for grain carts to park) until the unloaded grain cart 82 receives a signal (e.g., from the loading grain cart 72) indicating that the loading grain cart 72 is ready to move to the agricultural product storage tank 78 and/or that the queued and unloaded grain cart 86 immediately behind the loading grain cart 72 is in position for the combine 10 to unload grain. The unloaded grain cart 82 may then move to the combine 10. In some instances, the unloaded grain cart 82 may be in a queue with the other unloaded grain carts that are also empty and ready to receive grain. If the unloaded grain cart 82 is at the front of the queue, and the unloaded grain cart 82 receives a signal (e.g., from the loading grain cart 72) indicating that the loading grain cart 72 is ready to move to the agricultural product storage tank 78 and/or that the queued and unloaded grain cart 86 immediately behind the loading grain cart 72 is in position for the combine 10 to unload grain (such that there is no interruption between grain carts from the viewpoint of the combine 10), the unloaded grain cart 82 may move to the combine 10. The unloaded grain cart 82 may send a signal indicating that the unloaded grain cart 82 is moving to the combine 10.

The unloaded grain cart 82 may determine a route 84 and/or speed to travel to the combine 10 based at least in part on a current location of the unloaded grain cart 82, a current location of the combine 10, the harvesting map, the location of the agricultural product storage tank 78, the terrain along the route, the rate of unloading of the combine 10, the rate of unloading of each grain cart to the agricultural product storage tank 78, the speed of the combine 10 while harvesting the crop area 32, the maximum speed of each grain cart (loaded and unloaded), the maximum grain cart turn rate, the maximum grain cart turn angle, or any combination thereof. The current location of the combine 10 may be determined by the location device of the combine 10 and sent by the combine 10 to each grain cart. In some embodiments, the route 84 and/or speed to travel may be determined based at least in part on the current location of the unloaded grain cart 82, the current location of the combine 10, the harvesting map, the speed of the combine 10, the maximum speed of the unloaded grain cart 82, the maximum grain cart turn rate, the maximum grain cart turn angle, or a combination thereof, thereby enabling the controller of the unloaded grain cart 82 may predict or estimate a future location of the combine 10 at the time of rendezvous. In some embodiments, the route 84 and/or speed to travel may be determined such that an unloaded grain cart 86 arrives at the combine 10 before the threshold weight or threshold fill depth of the currently loading grain cart 72 and/or the threshold weight or threshold fill depth of the combine 10 has been met.

In some embodiments, the route 84 and/or speed to travel may be updated or modified based at least in part on the aforementioned factors. Similarly, the predicted or estimated location of the combine 10 may be updated or modified based at least in part on at one of the aforementioned factors. For example, the controller of an unloaded grain cart 82 may determine that the combine 10 has changed speed or deviated from the route (e.g., as provided by the harvesting map). The controller of the unloaded grain cart 82 may update or modify the route 84 and/or the speed to account for the different estimated future location of the combine 10. The route 84 and/or the speed may be updated asynchronously or synchronously, as previously discussed.

Upon arriving at the location of the combine 10, the unloaded grain cart may queue behind the loading grain cart 72 while the combine 10 unloads grain from the storage tank 14 to the loading grain cart 72. In some instances, the unloaded grain cart may queue behind one or more queued and unloaded grain carts 86. The now queued grain cart may send a signal that the grain cart is queued and following the combine 10, the loading grain cart 72, and any other queued grain carts. When the queued grain cart receives a signal indicating that the loading grain cart 72 has been loaded (e.g., such that the threshold weight or the threshold fill depth of the loading grain cart 72 is met) and/or is moving toward the agricultural product storage tank 78, the queued grain cart may move into position to be loaded by the combine 10 or advance in the queue. The queued grain cart may send a signal indicating that the queued grain cart has moved into position to be loaded by the combine 10 or advanced in the queue. In this manner, the system 70 may ensure that the combine 10 harvests the crop area 32 without stopping to wait for the next grain cart to arrive.

As such, the possibility of the storage tank 14 becoming completely full, such that harvesting operations are suspended, is substantially reduced or eliminated. In addition, the storage tank 14 of the combine 10 may thus be reduced in size and weight, thereby reducing soil compaction as the combine 10 traverses the field. The overall result is significantly increased crop productivity. Using the multiple grain carts in the continuous system 70 may result in smaller and lighter grain carts. The smaller grain carts further reduce soil compaction as the grain carts traverse the field, thereby increasing crop productivity.

FIG. 6 is a perspective view of the unloaded grain cart 86 queued behind the loading grain cart 72, in which both grain carts 86, 72 are dimensioned to fit behind the header 12 of the combine 10 of FIG. 1, in accordance with an embodiment of the present disclosure. As illustrated, both grain carts 86, 72 are dimensioned such that the respective widths 61 are less than or equal to the distance 63 from an end 64 of the header 12 to a closer lateral side 66 of the combine 10. As such, each grain cart 86, 72 may be dimensioned such that each grain cart 86, 72 fits behind the header 12 of the combine 10, thereby enabling each grain cart 86, 72 to travel alongside the combine 10 on the crop side of the combine 10 and increase harvesting efficiency. Once the threshold weight or the threshold fill depth of the loading grain cart 72 and/or the threshold weight or the threshold fill depth of the combine 10 is met, the loading grain cart 72 may proceed to the agricultural product storage tank, and the unloaded grain cart 86 may take the place of the loading grain cart 72. Thus, the delay from unloading to a first grain cart 72 to unloading to a second grain cart 86 may be reduced, thereby increasing overall crop production efficiency. In some embodiments, the combine 10 may stop unloading grain during the delay. During the delay, the grain may be stored in the storage tank 14 while the first grain cart 72 moves back from the combine 10 and proceeds to the agricultural product storage tank and the second grain cart 86 moves into position to receive the unloading grain. In some embodiments, the transition time from the first grain cart 72 to the second grain cart 86 may be short. For example, when the threshold weight or threshold fill depth of the loading grain cart 72 and/or the threshold weight or threshold fill depth of the combine 10 is met, the first grain cart 72 may move forward toward the header 12. The second grain cart 86 may move into position immediately behind the first grain cart 72. In this manner, the transition between the grain carts 72, 86 may be quick, and the combine 10 may continue unloading grain without a substantial interruption. The first grain cart 72 may proceed to the agricultural product storage tank once the grain cart is able to without traveling through the crop area 32 (e.g., after a 180 degree turn by the combine 10 as illustrated in FIG. 2).

FIG. 7 is a flow diagram of a method 100 for continuously conveying grain from the combine of FIG. 1 to the agricultural product storage tank, which is performed by a grain cart of FIG. 3, in accordance with an embodiment of the present disclosure. The grain cart controller maintains (block 102) the speed of the grain cart with the combine at least while the combine unloads grain to the grain cart. The grain cart controller determines (block 104) when a threshold weight or threshold fill depth of the grain cart is met. For example, the grain cart controller may receive a signal from the weight or fill sensor of the grain cart indicating that the threshold weight or the threshold fill depth has been met. The grain cart controller determines (block 106) the route to the agricultural product storage tank based at least in part on the location of the grain cart and the location of the agricultural product storage tank. The grain cart controller controls (block 108) the grain cart (e.g., to move to the agricultural product storage tank) based at least in part on the route (from block 106) to the agricultural product storage tank after the threshold weight or the threshold fill depth of the grain cart is met. The grain cart controller receives (block 110) a signal indicating that another grain cart is moving to the agricultural product storage tank from the combine. In some instances, the signal may be received after the grain cart has unloaded grain to the agricultural product storage tank. The grain cart controller then determines (block 112) a future or expected position of the combine based at least in part on the harvesting map for the combine (which may include expected locations of the combine at various times, based at least in part on the speed of the combine). In some embodiments, the expected position of the combine may be determined based at least in part on the location of the combine, the harvesting map for the combine, and a speed of the combine.

The grain cart controller determines (block 114) a route to the expected position of the combine (from block 112) based at least in part on the expected position of the combine and the location of the grain cart. The grain cart controller controls (block 116) the grain cart (e.g., to move to the expected position of the combine) based at least in part on the route (from block 114) to the expected position of the combine (e.g., after the signal indicating that the other grain cart is moving to the agricultural product storage tank from the combine is received).

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system for conveying agricultural product, comprising:
    at least one autonomous grain cart configured to receive agricultural product from an agricultural vehicle, wherein the agricultural vehicle comprises a header configured to harvest the agricultural product from a field, wherein each autonomous grain cart of the at least one autonomous grain cart has a width less than or equal to a distance from an end of the header of the agricultural vehicle to a lateral side of the agricultural vehicle, wherein the end and the lateral side are on a same longitudinal side of a lateral centerline of the agricultural vehicle, wherein each autonomous grain cart of the at least one autonomous grain cart comprises:
  a controller, comprising one or more processors and one or more memory devices;
  a drive system communicatively coupled to the controller, wherein the controller is configured to instruct the drive system to propel the autonomous grain cart; and
  a steering system communicatively coupled to the controller, wherein the controller is configured to instruct the steering system to steer the autonomous grain cart;
  wherein the controller of the at least one autonomous grain cart is configured to determine an expected location of the agricultural vehicle based at least in part on a harvesting map for the agricultural vehicle that includes a projected path of the vehicle, wherein the harvesting map is configured such the agricultural vehicle is guided to make end of row turns to harvest a second path that is generally parallel to and in an opposing direction from a previously harvested path, wherein when the agricultural vehicle is traveling along the second path the controller instructs the steering system to travel a route laterally between the agricultural vehicle and unharvested crop.

2. The system of claim 1, wherein each autonomous grain cart comprises a location device communicatively coupled to the controller, wherein the location device is configured to determine a location of the autonomous grain cart.

3. The system of claim 1, wherein the harvesting map comprises expected locations of the agricultural vehicle at various times.

4. The system of claim 1, wherein the controller of each autonomous grain cart is configured to update the expected location of the agricultural vehicle based at least in part on the location of the agricultural vehicle, a speed of the agricultural vehicle, or a combination thereof.

5. The system of any of claim 1, wherein the controller of each autonomous grain cart is configured to determine the route to the expected location of the agricultural vehicle based at least in part on the expected location of the agricultural vehicle and the location of the autonomous grain cart.

6. The system of claim 5, wherein the controller of each autonomous grain cart is configured to update the route to the expected location of the agricultural vehicle based at least in part on a location of each autonomous grain cart of the at least one autonomous grain cart, terrain along the route, or a combination thereof.

7. The system of claim 1, wherein each autonomous grain cart comprises a communication device communicatively coupled to the controller, wherein the communication device is configured to send signals to and receive signals from a corresponding communication device of another autonomous grain cart of the at least one autonomous grain cart.

8. The system of claim 1, wherein each autonomous grain cart comprises a communication device communicatively coupled to the controller, wherein the communication device is configured to send signals to and receive signals from a communication device of the agricultural vehicle.

9. The system of claim 1, wherein each autonomous grain cart comprises one or more sensors communicatively coupled to the controller.

10. An autonomous grain cart, comprising:
  a width less than or equal to a distance from an end of a header of an agricultural vehicle to a lateral side of the agricultural vehicle, wherein the end and the lateral side are on a same longitudinal side of a lateral centerline of the agricultural vehicle, wherein the autonomous grain cart is configured to receive grain from the agricultural vehicle;
  a controller, comprising a one or more processors and one or more memory devices;
  a drive system communicatively coupled to the controller, wherein the controller is configured to instruct the drive system to propel the autonomous grain cart; and
  a steering system communicatively coupled to the controller, wherein the controller is configured to instruct the steering system to steer the autonomous grain cart;
  a communication device configured to send signals to and receive signals with a second communication device to coordinate with another queued autonomous grain cart to move into the present position of the automous grain cart with respect to the agricultural vehicle when the controller determines the autonomous grain cart should be instructed to travel to an unload position.

11. The autonomous grain cart of claim 10, comprising one or more sensors, wherein the one or more sensors comprise:
  a terrain sensor configured to output a signal indicative of at least one property of terrain proximate to the autonomous grain cart;
  a speed sensor configured to determine a speed of the autonomous grain cart;
  a weight sensor configured to determine a weight of at least the grain within the autonomous grain cart;
  a fill sensor configured to determine a depth of the grain within the grain cart; or
  a combination thereof.

12. The autonomous grain cart of claim 10, comprising a location device configured to determine a location of the autonomous grain cart.

13. The autonomous grain cart of claim 10, wherein the communication device is further configured to send signals to and receive signals from a communication device of the agricultural vehicle.

14. A system for conveying agricultural product, comprising:
  an agricultural vehicle comprising a header configured to harvest agricultural product from a field;
  a first and second autonomous grain carts, each having a width less than or equal to a distance from an end of the header of the agricultural vehicle to a lateral side of the agricultural vehicle, wherein the end and the lateral side are on a same longitudinal side of a lateral centerline of the agricultural vehicle, wherein the first and second autonomous grain cart each comprise:
    a controller, comprising one or more processors and one or more memory devices;
    a drive system communicatively coupled to the controller, wherein the controller is configured to instruct the drive system to propel the respective autonomous grain cart; and
    a steering system communicatively coupled to the controller, wherein the controller is configured to instruct the steering system to steer the respective autonomous grain cart; and
  an agricultural product storage tank configured to store the agricultural product;
  wherein each autonomous grain cart of the first and second autonomous grain carts is configured to receive the agricultural product from the agricultural vehicle and deliver the agricultural product to the agricultural product storage tank, wherein the controller and steering system of the second autonomous grain cart is configured to control the second autonomous grain cart to follow the agricultural vehicle and queue while the first autonomous vehicle is in an unloading position.

15. The system of claim 14, wherein the controller of each autonomous grain cart is configured to determine a route to the agricultural product storage tank, based at least in part on a location of the autonomous grain cart and a location of the agricultural product storage tank.

16. The system of claim 15, wherein the controller of each autonomous grain cart is configured to update the route to the agricultural product storage tank based at least in part on locations of each autonomous grain cart of the first and second autonomous grain carts, terrain along the route, or a combination thereof.

17. The system of claim 14, wherein the controller of each autonomous grain cart is configured to position the autonomous grain cart behind one or more other autonomous grain carts, wherein one of the one or more other autonomous grain carts is in position to deliver the agricultural product to the agricultural product storage tank.

18. The system of claim 14, where when a threshold weight or threshold fill depth of the first cart is met, the controller and steering system of the first autonomous grain cart control the first autonomous grain cart to move forward toward the header into a staging position and the controller and steering system of the second autonomous grain cart control the second autonomous grain cart to move into the unloading position behind the first autonomous grain cart, wherein the first autonomous grain cart will travel in the staging position until it is able to travel to a product storage tank without traveling through an unharvested crop area.

* * * * *